(12) United States Patent
Takahashi et al.

(10) Patent No.: US 7,999,907 B2
(45) Date of Patent: Aug. 16, 2011

(54) METHOD FOR PRODUCING COLOR FILTER, COLOR FILTER, LIQUID CRYSTAL DISPLAY DEVICE AND PRODUCING APPARATUS

(75) Inventors: Hirohisa Takahashi, Sammu (JP); Isao Sugiura, Sammu (JP); Atsushi Ohta, Sammu (JP); Satoru Ishibashi, Sammu (JP)

(73) Assignee: Ulvac, Inc., Chigasaki-shi (JP)

( * ) Notice: Subject to any disclaimer, the term of this patent is extended or adjusted under 35 U.S.C. 154(b) by 0 days.

(21) Appl. No.: 12/705,049

(22) Filed: Feb. 12, 2010

(65) Prior Publication Data

US 2010/0141878 A1 Jun. 10, 2010

Related U.S. Application Data

(63) Continuation of application No. PCT/JP2008/064802, filed on Aug. 20, 2008.

(30) Foreign Application Priority Data

Aug. 22, 2007 (JP) ................................. 2007-215996

(51) Int. Cl.
*G02F 1/13* (2006.01)

(52) U.S. Cl. ....................................... 349/187; 349/106
(58) Field of Classification Search .................... 349/187
See application file for complete search history.

(56) References Cited

U.S. PATENT DOCUMENTS

| 5,441,615 A * | 8/1995 | Mukai et al. ............. 204/192.12 |
| 6,259,505 B1 * | 7/2001 | Makino ......................... 349/153 |
| 2007/0002252 A1 * | 1/2007 | Kaneko et al. ................ 349/141 |

FOREIGN PATENT DOCUMENTS

| JP | 60-112001 | 6/1985 |
| JP | 64-26821 | 1/1989 |
| JP | 2-284118 | 11/1990 |
| JP | 4-303824 | 10/1992 |
| JP | 7-318713 | 12/1995 |
| JP | 2001-174838 A1 | 6/2001 |
| JP | 2003-66217 A1 | 3/2003 |
| JP | 2003-287618 A1 | 10/2003 |

OTHER PUBLICATIONS

International Search Report for International Application No. PCT/JP2008/064802 dated Sep. 4, 2008.

* cited by examiner

*Primary Examiner* — Richard H Kim
(74) *Attorney, Agent, or Firm* — Kratz, Quintos & Hanson, LLP

(57) ABSTRACT

Exfoliation of an etching stopper is prevented. A color filter of the present invention includes an inorganic protection film (etching stopper) composed mainly of $SnO_2$. Since the inorganic protection film as such not only has a high specific resistance but also has a linear expansion coefficient close to the linear expansion coefficient of a transparent electrode, the inorganic protection film is not exfoliated from the transparent electrode or the resin layer even if an object to be processed is heated. Since the inorganic protection film and the transparent electrode can be formed in the same film forming chamber, the time required to produce the color filter can be shortened as compared to in the conventional technique.

9 Claims, 2 Drawing Sheets

METHOD FOR PRODUCING COLOR FILTER, COLOR FILTER, LIQUID CRYSTAL DISPLAY DEVICE AND PRODUCING APPARATUS

This application is a continuation of International Application No. PCT/JP2008/064802, filed on Aug. 20, 2008, which claims priority to Japan Patent Application No. 2007-215996, filed on Aug. 22, 2007. The contents of the prior applications are herein incorporated by reference in their entireties.

BACKGROUND OF THE INVENTION

1. Field of the Invention

The present invention generally relates to a technology for producing a liquid crystal display device.

2. Description of the Background Art

There are a TN (Twisted Nematic) system, a VA (Vertical Alignment) system or the like, for the liquid crystal display devices, and a PVA (Patterned Vertical Alignment) system having a wider view angle, a higher contrast, and so forth have recently attracted attention.

The PVA system liquid crystal display device possesses a color filter having a colored resin layer and a transparent electrode (counter electrode) laminated on a transparent substrate and a pixel substrate on which a plurality of pixel electrodes are disposed on a substrate. The transparent electrode of the color filter is patterned, and an opened pattern (opening) is formed.

The color filter and the pixel substrate are bonded oppositely across a liquid crystal. The openings of the transparent electrode are located immediately above the respective pixel electrodes. When a voltage is applied between a selected pixel electrode and the transparent electrode, the electric field between the pixel electrode and the transparent electrode becomes oblique to a surface of the pixel electrode, so that major axes of molecules of the liquid crystal are obliquely inclined relative to the surface of the pixel electrode, and the view angle becomes wide. In this connection, an example of the PVA system liquid crystal display device is described in Patent Document 1 listed below.

In general, the transparent electrode is patterned by dissolving predetermined portions of the transparent electrode into an etching liquid, with a $SiO_2$ thin film disposed between the resin layer and the transparent electrode. Since the $SiO_2$ thin film has high transparency and is not dissolved into the etching liquid for etching the transparent electrode, it functions as an etching stopper.

However, since the $SiO_2$ film largely differs in linear expansion coefficient from the transparent electrode (such as, for example, ITO), there was a problem that the transparent electrode was likely to be exfoliated from the $SiO_2$ film.

In forming a $SiO_2$ film, there is available a sputtering method in which a $SiO_2$ target is sputtered and a reactive sputtering method for sputtering a Si target while oxygen is being introduced.

However, when the $SiO_2$ target is used, an RF (radio frequency) power source is employed because the discharging of electricity is not stabilized in such cases as when a DC (direct current) power source or an AC (alternate current) power source is used. Usually, when the transparent electroconductive film (ITO) is subsequently formed by sputtering, the AC or DC power source is used. However, since they differ from the RF power source in the manner in which they are installed, it has been necessary to separate chambers for forming the $SiO_2$ film and for forming the transparent electroconductive film (ITO).

Also, when the reactive sputtering is used to sputter an Si target, a large amount of oxygen is introduced, so that the chamber for introducing oxygen has to be separated from the chamber for forming the ITO film by sputtering. For this reason, it was difficult to form a $SiO_2$ film and a transparent electrode film (ITO) in the same chamber, thereby resulting in the production of apparatuses that are large.

Further, in using the reactive sputtering for the formation of the $SiO_2$ film, there have been the problems due to the occurrence of arcing, and of low film forming speed. Moreover, when the RF power source is used, the cost of the apparatus tend to increase due to the added costs of the power source and treatment for surface waves.

It is desirable that the film as an etching stopper and the transparent electroconductive film can be formed in one and the same chamber, so as to reduce the size of the entire apparatus and decreases the manufacturing cost thereof.

See Japanese Patent Documents JP-A 2003-287618, JP-A 2001-174838, and JP-A 7-318713.

SUMMARY OF THE INVENTION

The present invention has been accomplished to solve the above-explained problems, and its object is to provide a color filter on which a transparent electrode is hardly exfoliated, and an apparatus for producing the same.

In order to solve the above-explained problems, an embodiment of the present invention is directed to a method for producing a color filter that has a transparent substrate, a resin layer formed on a surface of the transparent substrate, an inorganic protection film formed on a surface of the resin layer, and a transparent electrode formed on a surface of the inorganic protection film with openings. The method has the steps of: forming transparent electrode on the surface of the inorganic protection film composed mainly of $SnO_2$; and patterning to form the openings by bringing the transparent electrode into contact with an etching liquid, which dissolves the inorganic protection film at a speed slower than the speed in dissolving the transparent electrode to make the surface of the inorganic protection film exposed on bottom faces of the opening.

The present embodiment may also be directed to the color filter producing method, further including the steps of: disposing a first target composed mainly of $SnO_2$ and a second target composed mainly of a transparent electroconductive material inside a vacuum chamber; making the film forming atmosphere above a surface of the first target and the film forming atmosphere above a surface of the second target ready to connect to each other when a film forming atmosphere containing at least a sputtering gas is formed inside the vacuum chamber; sputtering the first target to form the inorganic protection film, in a state such that the transparent substrate with the resin layer exposed is disposed inside the vacuum chamber; connecting the film forming atmosphere above the surface of the first target and the film forming atmosphere above the surface of the second target; and sputtering the second target to form the transparent electrode.

The present embodiment may also be directed to the color filter producing method, further including the steps of: forming the film forming atmosphere with a oxidation gas including oxygen atom in its chemical structure added; sputtering the first and second targets in a state such that a partial pressure of the oxidation gas included in the film forming atmosphere above the surface of the first target and a partial pressure of the oxidation gas included in the film forming atmosphere above the surface of the second target are made equal.

The present embodiment may be directed to the color filter producing method, further including the steps of: forming the film forming atmosphere with an oxidation gas including oxygen atom in its chemical structure; and sputtering the first and second targets in a state such that a partial pressure of the oxidation gas included in the film forming atmosphere above the surface of the first target is made higher than a partial pressure of the oxidation gas included in the film forming atmosphere above the surface of the second target.

The present embodiment may be directed to the color filter producing method, wherein the transparent electrode includes either one or both of $In_2O_3$ and ZnO.

An embodiment of the present invention may be directed to a color filter including a transparent substrate, a resin layer disposed on a surface of the transparent substrate, and including colored resin films, an inorganic protection film disposed on a surface of the resin layer and composed mainly of $SnO_2$, and a transparent electrode disposed coherent onto a surface of the inorganic protection film, the transparent electrode being patterned.

The present embodiment may also be directed to the color filter, wherein a specific resistance of the inorganic protection film is at least 10 times as large as a specific resistance of the transparent electrode.

An embodiment of the present invention is directed to a liquid crystal display device in which a color filter and a pixel electrode substrate are bonded oppositely, the color filter having a transparent substrate; a resin layer disposed on a surface of the transparent substrate and having colored resin films; an inorganic protection film disposed on a surface of the resin layer and composed mainly of $SnO_2$; and a transparent electrode disposed coherent onto a surface of the inorganic protection film, the electrode being patterned, the pixel electrode substrate having a substrate and pixel electrodes formed on a surface of the substrate, and the transparent electrode and the pixel electrodes being bonded such that they are in opposed positions across liquid crystals.

The present embodiment may also be directed to the liquid crystal display device, wherein a specific resistance of the inorganic protection film is at least 10 times as large as a specific resistance of the transparent electrode.

An embodiment of the present invention may be directed to a producing apparatus, having a vacuum chamber, first and second targets respectively disposed inside the vacuum chamber, a power source for applying voltage to the first and second targets, and a gas introduction system for feeding a sputtering gas and an oxidation gas including an oxygen atom in a chemical structure into the vacuum chamber, wherein the first target being composed mainly of $SnO_2$, and the second target being composed mainly of a transparent electroconductive material.

The present invention may also be directed to the producing apparatus, wherein the second target includes either one or both of $In_2O_3$ and ZnO as the transparent electroconductive material.

The phrase "composed mainly" in the present invention means to contain more than 50 mass % of the material which is "composed mainly".

According to an embodiment of the present invention, which is constructed as explained above, by applying direct current voltage to the first and second targets, not only a DC power source which is less expensive than an AC power source or an RF power source can be used as the power source of the producing apparatus, but also the structure of the apparatus can be simpler, all of which makes it possible to reduce the cost for producing the apparatus.

When the first target is composed of $SnO_2$ alone, because the electric resistance thereof is higher than the electric resistance of the second target, sputtering may not be performed with the direct current voltage or the sputtering may be performed with the generation of an abnormal electrical discharge. Thus, it is desirable for the electric resistance to be reduced by adding an impurity element into the first target.

Since Sn is a Group 4B element, the impurity element to be added to the first target is at least one of the element groups of Group 5B elements, Group 5A elements, Group 3A elements and Group 3B elements.

When either one or both of Group 5B element and Group 5A element are incorporated into the first target, it is converted to an n-type semiconductor. When either one or both of Group 3A element and Group 3B element are incorporated into the first target, it is converted to a p-type semiconductor.

In the case where the first target is any of the n-type and the p-type, its electric resistance is lower than a case where no impurity element is added, so that by stable sputtering when the direct current voltage is applied, the formation of an oxide film by using the oxide target can be possible. $SiO_2$ cannot be stably sputtered with the direct current if an impurity element is added.

The ability to use an oxide target means that the additive amount of oxygen to be fed into the vacuum chamber on forming the film can be smaller.

In this case, since $SnO_2$ is converted to the n-type resulting from the absence of oxygen, the Group 5A, 5B elements are more suitable for the present invention than the Group 3A and 3B elements in which positive holes and free electrons are offset with each other.

$SnO_2$ not only has high transparency, but also has a smaller difference in a linear expansion coefficient from the transparent electroconductive material (for example, ITO, ZnO, IZO) than $SiO_2$.

More specifically, the linear expansion coefficient of $SnO_2$ is $3.76 \times 10^{-6}/°$ C. to $4 \times 10^{-6}/°$ C. in a temperature range of 273K to 1073K (0° C. to 800° C.), while the linear expansion coefficient of $SiO_2$ (amorphous) is $0.5 \times 10^{-6}/°$ C. in a temperature range of 20° C. to 900° C. Among the above-mentioned electroconductive materials, for example, the linear expansion coefficient of ITO is $7.2 \times 10^{-6}/°$ C.

Therefore, the difference in the linear expansion coefficient is small between the inorganic protection film composed mainly of $SnO_2$ and the transparent electrode composed mainly of the above-discussed transparent electroconductive material, so that even when the inorganic protection film is heated at the time of forming a film of the transparent electrode or after the film formation of the transparent electrode, the inorganic protection film does not exfoliate from the transparent electrode.

The main component of the second target is not limited, so long as it is a transparent electroconductive material. More specifically, a transparent electroconductive film (transparent electrode) composed mainly of either one or both of $In_2O_3$ and ZnO is obtained by sputtering the second target composed mainly of either one or both of $In_2O_3$ and ZnO.

In IZO (composed mainly of $In_2O_3$ and including ZnO) as one example of the main component of the second target, Zn of Group 2 is included as an impurity to In of Group 3 so as to make the transparent electrode amorphous.

Although the impurity to be added to the second target is not particularly limited, when $In_2O_3$ is the main component, $SnO_2$, $TiO_2$, ZnO or the like can be named, and when ZnO is the main component in one example, $Al_2O_3$, $B_2O_3$, $Ga_2O_3$ or the like can be named. Basically, an n-type semiconductor is obtained by adding an impurity element having a valence greater than that of a metal which is the main component, except that Zn having a valence smaller by one is added in order to make $In_2O_3$—ZnO amorphous.

EFFECTS OF THE INVENTION

Since the first and second targets are disposed inside the same vacuum chamber, it is easy to reduce the size of the producing apparatus, and the producing cost of the producing apparatus is low. Since the first and second targets are sputtered in the same film forming atmosphere, a step of forming the inorganic protection film and a step of forming the transparent electrode are continuously performed, so that the time for producing the color filter is shortened. The inorganic protection film is not exfoliated from the transparent electrode or the resin layer. The inorganic protection layer has high insulation.

DETAILED DESCRIPTION OF THE PREFERRED EMBODIMENTS

Best Mode for Carrying out the Invention

Figure 2:
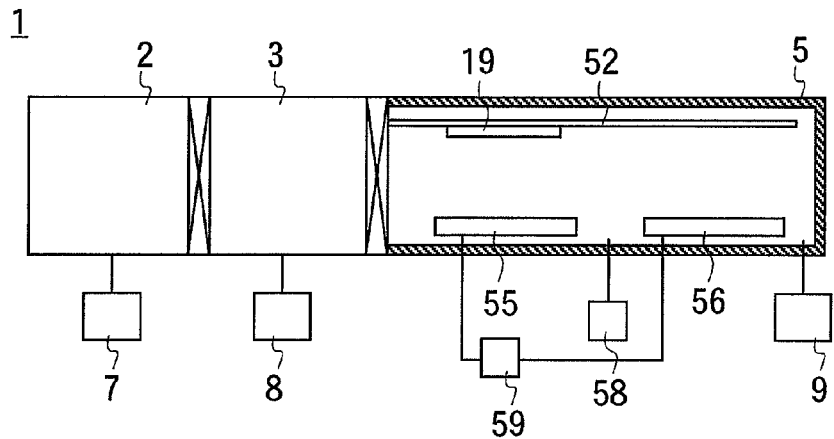
FIG. 2 is a schematic diagram illustrating sectional view of a producing apparatus to be used in an embodiment of the present invention.

In FIG. 2, a reference numeral 1 generally denotes one example of the producing apparatus of the present invention. The producing apparatus 1 has a film forming chamber 5 including a vacuum chamber, a first and a second targets 55, 56 disposed apart from each other inside the film forming chamber 5, and a power source 59 connected to the first and second targets 55, 56.

The film forming chamber 5 is connected to a carrying-in/out chamber 2 directly or via a heating chamber 3. A heater is disposed inside the heating chamber 3, and an object to be processed is carried from the carrying in/out chamber 2 directly into the film forming chamber 5. Alternatively, the object is heated with the heater inside the heating chamber 3, and carried into the film forming chamber 5.

A carriage means 52 is disposed inside the film forming chamber 5, and when the object to be processed is carried into the film forming chamber 5, it is carried by the carriage means 52 inside the film forming chamber 5 so that the object passes a position opposed to the first target 55 and a position opposed to the second target 56 in the described order.

A gas feed system 58 and a vacuum evacuation system 9 are connected to the film forming chamber 5. There is no partition between the first and second targets 55, 56, so that when a sputtering gas is fed from the gas feed system 58 into the film forming chamber 5, the first and second targets 55, 56 are exposed to the gas fed from the same gas feed system 58, and exposed to the same pressure atmosphere.

The first and second targets 55, 56 are connected to the same power source 59 or different power sources. In this embodiment, the power source 59 is a DC (direct current) power source, and a direct current voltage is applied to each of the first and second targets 55, 56.

The interior of the film forming chamber 5 is evacuated to vacuum by the vacuum evacuation system 9; and when the voltage is applied to the first and second targets 55, 56 while the gas containing a sputtering gas is being fed from the gas feed system 58 to the film forming chamber 5, the first and second targets 55, 56 are sputtered in the gas having the same composition and the same compounding proportion, and sputtered particles are emitted.

When the object to be processed passes the position opposed to the first target 55, the sputtered particles from the first target 55 reach to form a first thin film. When the object passes the position opposed to the second target 56, the sputtered particles from the second target 56 reach to form a second thin film.

The carriage means 52 can change the carrying speed of the object to be processed at a desired position. If there is a difference between the thin film formed with the sputtered particles from the first target 55 and the thin film formed with the sputtered particles from the second target 56 in film forming speed or in the thicknesses of the films to be formed, the respective thin films can be formed at desired film thicknesses by changing the carrying speed of the object to be processed between when the object passes the position opposed to the first target 55 and when the object passes the position opposed to the second target 56.

Next, steps of producing a color filter by using this producing apparatus 1 will be discussed.

A reference numeral 19 of FIG. 1 (a) denotes an example of the object to be processed. The object to be processed 19 has a transparent substrate 11 having a plastic substrate or a glass substrate, and a resin layer 22 disposed on a surface of the transparent substrate 11.

The resin layer 22 has heat-resistant resin films to which coloring agents are added (colored films 16 to 18); two or more colors of the colored films 16 to 18 (in this embodiment, three colors of red, green and blue) are referred to as a set of a color unit 15; and a plurality of color units 15 are disposed next to each other at a predetermined interval on the surface of the transparent substrate 11.

In this embodiment, an overcoat layer 14 made of resin is formed on a face of the transparent substrate 11 on which the colored units 15 are disposed, so that each of the colored films 16 to 18 are covered with the overcoat layer 14. Alternatively, each of the colored films 16 to 18 may be exposed on the surface of the resin layer 22 without the formation of the overcoat 14.

Evacuation systems 7, 8 are connected to the carrying in/out chamber 2 and the heating chamber 3 of the above-mentioned producing apparatus 1, respectively. One or more of the objects 19 to be processed are carried into the carrying in/out chamber 2; and the interior of the carrying in/out chamber 2 is roughly evacuated with the evacuation system 7.

The interior of the heating chamber 3 and the film forming chamber 5 are preliminarily evacuated to vacuum; and the object (s) to be processed 19 is (are) carried into the film forming chamber 5 after the object (s) is (are) heated in the heating chamber 3, or not heated inside the heating chamber 3.

While the interior of the film forming chamber 5 is being evacuated to vacuum, an oxidation gas (in this embodiment, an oxygen gas) and a sputtering gas (such as, for example, Ar, Kr, and Xe) are fed from the gas feed system 58, thereby a film forming atmosphere is formed.

Since the first and second targets 55, 56 are disposed inside the same film forming chamber 5, the film forming atmosphere formed above the surface of the first target 55 and the film forming atmosphere formed above the surface of the second target 56 are connected to each other.

The specific resistance of the transparent electrode 23 increases when the partial pressure of the oxidation gas in the film forming atmosphere of the transparent electrode 23 is not only too high, but too low, while the transparency decreases when the partial pressure of the oxidation gas is too low. Since the transparent electrode 23 is required to have low resistance and transparency, an optimum partial pressure of the oxidation gas to form the transparent electrode 23 is preliminarily determined; and a film forming atmosphere having the optimum partial pressure of the oxidation gas is formed inside the film forming chamber 5.

Since there is no partition such as a shielding member (for example, a chimney) between the first and second targets 55, 56 in this embodiment, the partial pressure values of the oxidation gas of the film forming atmosphere above the surface of the first target 55 and the film forming atmosphere above the surface of the second target 56 becomes the optimum partial pressure of the oxidation gas to form the transparent electrode 23.

The second target 56 is composed mainly of $In_2O_3$.

The electroconductivity of the first target 55, which is composed mainly of $SnO_2$, is made to increase by adding Sb as an impurity element.

When the direct current voltage is applied to each of the first and second targets 55, 56 from the power source 59, both of the first and second targets 55, 56 are sputtered to emit the sputtered particles.

Figure 1A:
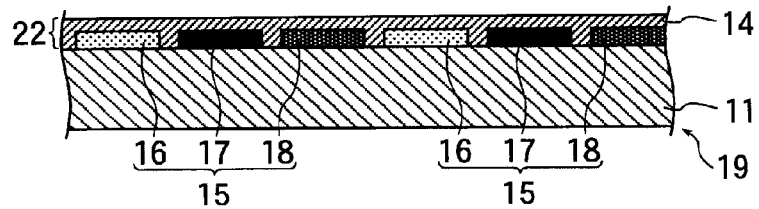
FIGS. 1 (a) to (e) are sectional views illustrating steps for producing a color filter.
Figure 1B:
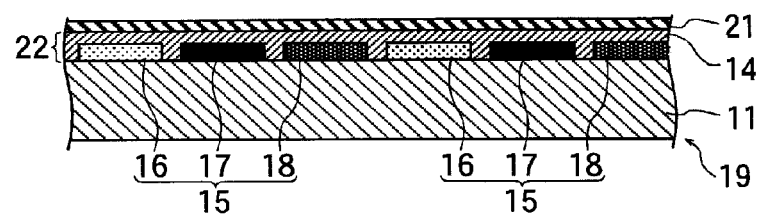
Figure 1C:
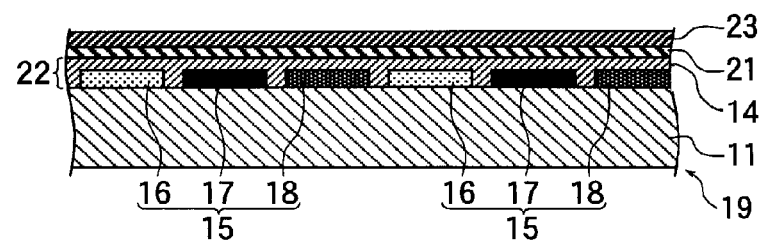

While the first and second targets 55, 56 are being sputtered with the partial pressure of the oxidation gas in the film forming atmosphere being kept at the optimum value for the formation of the transparent electrode 23 and the object to be processed 19 is carried, an inorganic protection layer 21 composed mainly of $SnO_2$ is formed coherent on a surface of the resin layer 22 when the object to be processed 19 passes the position opposed to the first target 55 (FIG. 1(b)), whereas when it passes the position opposed to the second target 56, the transparent electrode 23 composed mainly of $In_2O_3$ is formed coherent on a surface of the inorganic protection film 21 (FIG. 1(c)).

In this embodiment, since the first and second targets 55, 56 are simultaneously sputtered, so that when the first target 55 emits the sputtered particles, the second target 56 is also made to emit the sputtered particles.

In this state, transferring one or more of the objects to be processed 19 consecutively one by one or plurality by plurality, as the object to be processed 19 is moved from above the second target 56 after the formation of the transparent electrode 23, an object to be processed 19 on which an inorganic protection film 21 has been formed is moved from above the first target 55 to the second target 56, and an object to be processed 19 on which an inorganic protection film 21 is not yet formed is moved to above the first target 55.

In this way, when the objects to be processed 19 are consecutively transferred while both of the first and second targets 55, 56 are being sputtered, the objects to be processed 19 in large quantity can be efficiently processed in forming films.

When the partial pressure of the oxidation gas is made equal in each of the film forming atmospheres above the surfaces of the first and second targets 55, 56, the partial pressure of the oxidation gas is set to the optimum value for the formation of the transparent electrode 23 as discussed previously.

In the inorganic protection film 21, $SnO_2$ preferably has a higher specific resistance.

When the partial pressure of the oxidation gas is higher than the optimum value for the formation of the transparent electrode 23, the specific resistance of the inorganic protection film 21 becomes the largest.

When the sputtering is performed in a state such that the film forming atmospheres above the surfaces of the first and second targets 55, 56 are made to be the same, the impurity element in the first target 55 cannot be completely oxidized, which prevents the specific resistance of the inorganic protection film 21 from becoming maximized.

However, since the $SnO_2$-based material composed mainly of $SnO_2$ inherently has a higher electric resistance than an $In_2O_3$-based material composed mainly of $In_2O_3$ and a ZnO-based material composed mainly of ZnO, the electric resistance of the inorganic protection film 21 is sufficiently higher than the transparent electrode 23, even when the partial pressure of the oxidation gas is set to an optimal value for the formation of the transparent electrode 23.

Although the case in which the partial pressures of the oxidation gas are made equal above the surfaces of the first and second targets 55, 56 has been explained in the above, the present invention is not limited thereto.

When the first and second targets 55, 56 are sputtered in a state such that the partial pressure of the oxidation gas in the film forming atmosphere above the surface of the first target 55 is set higher than the partial pressure of the oxidation gas in the film forming atmosphere above the surface of the second target 56, the oxidation of the impurity element added to the first target 55 further proceeds, which can make the specific resistance of the inorganic protection film 21 higher than in the case where the partial pressures of the oxidation gases are set equal.

Additionally, although a method by which the partial pressure of the oxidation gas in the film forming atmosphere above the surface of the first target 55 is made higher than the partial pressure of the oxidation gas in the film forming atmosphere above the surface of the second target 56 is not particularly limited, there are the following exemplary methods: a method of making the distance between an ejection opening of the oxidation gas and the surface of the first target 55 shorter than the distance from the ejection opening to the surface of the second target 56; a method of surrounding the first target 55 by a shielding plate (chimney) and ejecting the oxidation gas into a space surrounded by the shielding plate; and a method surrounding the second target 56 by a shielding plate and ejecting the oxidation gas into a space outside of a space surrounded by the shielding plate.

The object to be processed 19 on which the inorganic protection film 21 and the transparent electrode 23 are formed is passed through the heating chamber 3 and then through the carrying in/out chamber 2, and taken out from the producing apparatus 1.

After the object to be processed 19 is taken out from the producing apparatus 1, the transparent electrode 23 is annealed by heating at 200° C. or more in an atmosphere containing oxygen (for example, in the air), or the transparent electrode 23 is patterned without being annealed.

Figure 1D:
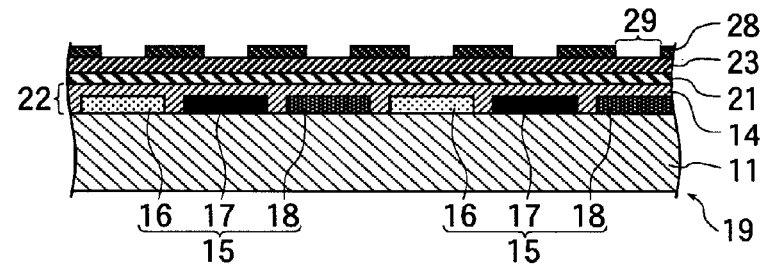
Figure 1E:
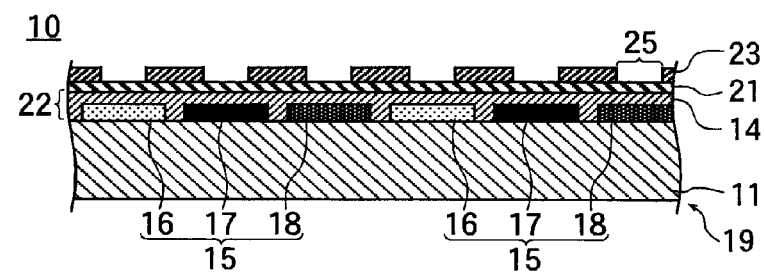

In order to pattern the transparent electrode 23, a resist film 28 patterned in a predetermined shape is first disposed on the surface of the transparent electrode 23 (FIG. 1(d)).

A window opening 29 is formed on the resist film 28 at a position opposed to pixel electrodes that will be mentioned later, so that the transparent electrode 23 is exposed on a bottom face of the window opening 29.

Etching liquid which dissolves $In_2O_3$ but does not dissolve $SnO_2$, or which dissolves $SnO_2$ at a slower rate than $In_2O_3$, like an iron chloride based etching liquid containing iron chloride or an aqua regia based etching liquid containing aqua regia, is prepared.

When the etching liquid is brought into contact with the transparent electrode 23 exposed at the bottom faces of the window openings 29 by immersing the object to be processed 19 into the etching liquid or spraying the etching liquid onto a face of the object to be processed 19 on which the resist film 28 is disposed, openings are formed through the removal of the exposed portions of the transparent electrode 23 by etching, and the etching stops in the thickness direction when the inorganic protection film 21 is exposed at the bottom faces of the window openings 29.

After the inorganic protection film 21 is exposed at all the bottom faces of the window openings 29, the object to be processed 19 is pulled out from the etching liquid, or spraying of the etching liquid is stopped; and the etching is terminated by removing the etching liquid through the washing of the object to be processed 19.

Then, when the resist film 28 is removed, a color filter 10 as shown in FIG. 1(*e*) is obtained. A reference numeral 25 of FIG. 1(*e*) shows the opening of the patterned transparent electrode 23; and the surface of the inorganic protection film 21 is exposed at a bottom face of the opening.

Figure 3:
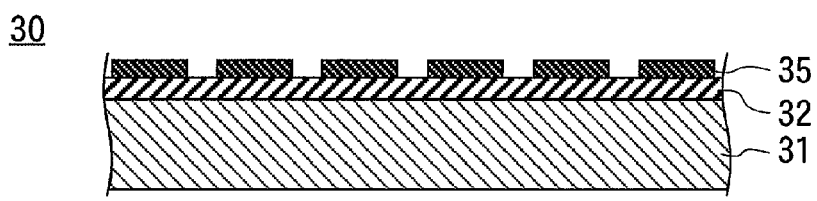
FIG. 3 is a sectional view illustrating an example of a pixel electrode substrate.

In FIG. 3, a reference numeral 30 shows a pixel electrode substrate. The pixel electrode substrate 30 has a substrate 31, an active layer 32 disposed on a surface of the substrate 31, and a plurality of pixel electrodes 35 disposed on the active layer 32.

Figure 4:
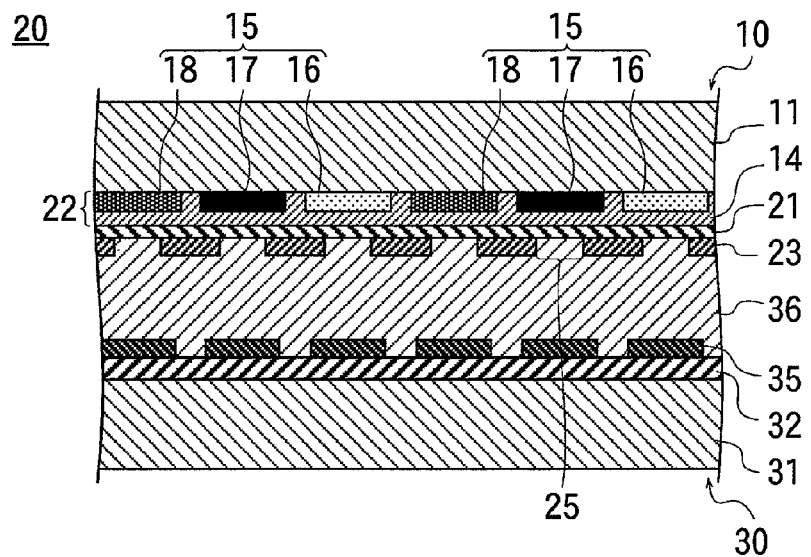
FIG. 4 is a sectional view illustrating an example of the liquid crystal display device to be used in an embodiment of the present invention.

When the color filter 10 and the pixel electrode substrate 30 are bonded across liquid crystals 36 such that the openings 25 of the transparent electrode 23 are positioned above the pixel electrodes 35, a liquid crystal display device 20 of a PVA system as shown in FIG. 4 is obtained.

The active layer 32 has thin film transistors (TFTs) and wirings. A TFT is connected to each of the pixel electrodes 35, and electrical continuity is established to the TFT in order to apply a voltage between the pixel electrode 35 to which the TFT is connected and the transparent electrode 23.

As discussed above, the openings 25 of the transparent electrode 23 are positioned above the pixel electrodes 35; and the surface of the inorganic protection film 21 are positioned at the bottom faces of the openings 25.

Since the specific resistance of the inorganic protection film 21 is 10 times or more as large as the specific resistance of the transparent electrode 23, an electric field between the inorganic protection film 21 and the pixel electrodes 35 is weaker than the electric fields between the transparent electrode 23 and the pixel electrodes 35; and the electric field (potential gradient) at positions immediately under the openings 25 inclines toward the transparent electrode 23.

Since a long axis of molecules of the liquid crystals 36 incline along the inclination of the electric field, the long axis of the molecules of the liquid crystals 36 incline toward the transparent electrode 23 in the position immediately under the openings 25. As a result, the view angle of this liquid crystal display device 20 becomes wider.

The aforementioned description relates to the case in which the power source 59 is a direct current power source and the voltage to be applied to the first and second targets 55, 56 is the direct current voltage, the present invention not being limited thereto.

The first and second targets 55, 56 can be also sputtered by connecting an AC power source to either one or both of the first and second targets 55, 56 and applying an AC voltage to either one or both of the first and second targets 55, 56. However, a DC power source is most desirable to use because the DC power source is less expensive than AC power source, and the production cost in producing apparatus 1 is less expensive when using DC power than when using AC power source.

The aforementioned description relates to the case in which the main component of the second target 56 is ITO ($In_2O_3$—$SnO_2$), but the present invention is not limited thereto. The transparent electrode 23 composed mainly of either one or both of the $In_2O_3$ based material and the ZnO based material can be formed by sputtering the second target 56 containing either one or both of the $In_2O_3$ based material composed mainly of $In_2O_3$ (such as, for example, IZO, ITO) and the ZnO based material composed mainly of ZnO (such as, for example, AZO, GZO, BZO).

The specific resistance of the transparent electrode 23 formed by the sputtering method under a heating condition from room temperature to 200° C. is: $2\times10^{-4}\Omega\cdot cm$ to $5\times10^{-4}\Omega\cdot cm$ when the main component is ITO ($In_2O_3$—$SnO_2$); $5\times10^{-4}\Omega\cdot cm$ to $2\times10^{-3}\Omega\cdot cm$ when the main component is AZO (ZnO—$Al_2O_3$); and $3.7\times10^{-4}\Omega\cdot cm$ to $4\times10^{-4}\Omega\cdot cm$ when the main component is IZO ($In_2O_3$—ZnO).

The specific resistance of the thin film ($SnO_2$—$Sb_2O_3$) composed mainly of $SnO_2$ formed by the sputtering method under the same heating condition is $1\times10^{-2}\Omega\cdot cm$ to $2\times10^{-2}\Omega\cdot cm$, which is 10 times or more as large as the specific resistance of each transparent electrode 23. Therefore, the inorganic protection film 21 composed mainly of $SnO_2$ can possess sufficient electric characteristics for the transparent electrode 23 containing any of the transparent electroconductive material of ITO, ZnO or IZO.

The second target 56 composed mainly of $In_2O_3$ means, for example, a target which is composed mainly of $In_2O_3$ and contains 0.1 atom % or more to at most 20 atom % any one kind of additive element selected from a group of additive elements consisting of Group 2A, Group 4A, Group 2B, and Group 4B.

The second target 56 composed mainly of ZnO, for example, has the main component of ZnO and contains 0.1 atom % or more to at most 20 atom % at least any one kind of an additive element selected from a group of additive elements consisting of Group 1A, Group 3A, Group 4A, Group 1B, Group 3B, and Group 4B.

The impurity element which can be added to the first target 55 is not limited to Sb, for example, at least one kind from impurity elements of P, Ad and Bi as Group 5B elements, V, Nb and Ta as Group 5A elements, Sc and Y as Group 3A elements and B, Al, Ga, In and Ti as Group 3B elements may be incorporated into the first target 55.

The impurity element may be added to the first target 55 as a single element, but it can be added as an oxide (such as, for example, $Sb_2O_3$) or a nitride.

When the first target containing either one or both of Sn and $SnO_2$ and with at least one kind of the above-listed impurity elements added is sputtered in the film forming atmosphere containing oxygen and the sputtering gas, the inorganic protection film composed mainly of $SnO_2$ and containing at least one kind of the above-listed impurity elements is formed.

Also, the first target which contains either one or both of Sn and $SnO_2$ but does not contain the above-listed impurity element may be used. In such a case, when the first target is sputtered in the film forming atmosphere containing oxygen and the sputtering gas, an inorganic protection film which is composed mainly of $SnO_2$ but does not contain the above-listed impurity element is formed.

In the case of sputtering the first target 55 which is composed mainly of $SnO_2$ but does not contain the above-listed impurity element, it is desirable that an RF (radio frequency) power source is connected to the first target 55 and the sputtering is performed under the application of a radio frequency voltage. However, since the RF power source is more expensive than the DC power source and the AC power source, and the apparatus becomes more complex than an apparatus that uses an AC power source, the cost for the apparatus increases. In addition, the film forming speed is slower than in the case that uses the AC power source or the DC power source.

The aforementioned description relates to the case where the first and second targets 55, 56 are simultaneously sputtered in the same film forming atmosphere, but the present invention is not limited thereto. The first and second targets 55, 56 may be separately sputtered.

The producing apparatus to be used for producing the color filter 10 of the present invention is not particularly limited. For example, sputtering may be performed in a state such that the first and second targets 55, 56 are disposed in separate film forming chambers, or the film forming chamber is divided into two by placing a partition member between the first and second targets 55, 56 and the first and second targets 55, 56 are placed in different film forming atmospheres. In this case, the first and second targets 55, 56 may be sputtered with gases having different compositions and different compounding proportion.

For example, when the inorganic protection film 21 composed mainly of $SnO_2$ is formed by using the first target 55 composed mainly of Sn, 10 times to 100 times as much as the partial pressure of oxygen is required during the film formation than when a film of the transparent electrode 23 is formed by using the second target 56 containing the transparent electroconductive material (such as, ITO, ZnO, IZO or the like).

In contrast, when a film of the transparent electrode 23 is formed by sputtering the second target 56, the electric resistance of the transparent electrode 23 increases if the partial pressure of oxygen is too high.

Therefore, the first target 55 composed mainly of Sn is sputtered in a first film forming atmosphere containing oxygen gas and the sputtering gas, whereas, when the second target 56 composed mainly of the transparent electroconductive material is sputtered by a second film forming atmosphere containing oxygen gas and the sputtering gas, the partial pressure of the oxygen in the second film forming atmosphere is lower than the partial pressure of the oxygen in the first film forming atmosphere.

The gas to be introduced into the film forming chamber 5 together with the sputtering gas is not limited to the oxygen gas, and at least one kind of reactive gas selected from a reactive gas group consisting of other oxidation gases (such as, $O_2$, $H_2O$) containing an oxygen atom in their chemical structures and nitride gases (such as, $N_2$, $NH_3$) containing nitrogen atom in their chemical structures may be introduced. However, it is desirable to introduce the oxidation gas into the atmosphere in which the second target 56 is sputtered so as to optimize the absence of oxygen of a constituting material of the transparent electrode (such as, ITO or the like).

A magnetic field forming device may be disposed near the first and second targets 55, 56; lines of magnetic force passing the faces of the first and second targets 55, 56 which are to be sputtered are formed; and the first and second targets 55, 56 are magnetron-sputtered.

The film formation of the transparent electrode 23 and the inorganic protection film 21 are not limited to the sputtering method, but the film formation can be performed by a vapor deposition method, particularly with an ARE (Activated Reactive Evaporation) method. When the film formation is performed by the ARE method, the film formation of the inorganic protection film 21 and the transparent electrode 23 is performed in a rare gas (such as, Ar, K4) alone or in a film forming atmosphere in which either one or both of the oxidation gas (such as, $O_2$, $H_2O$) containing an oxygen atom in the chemical structure and the nitride gas (such as, N2, NH3) containing a nitrogen atom in a chemical structure is added to the rare gas.

Although the etching liquid to be used in the present invention is not limited, one example is that, when the transparent electrode 23 is not annealed after the film formation or when the film formation is performed without heating, an etching liquid having a high speed in dissolving the amorphous ITO (such as, an oxalic acid based etching liquid containing oxalic acid as an acid) is used because the transparent electrode 23 is composed mainly of the amorphous ITO.

When the transparent electrode 23 is annealed after the film formation or when such film formation is performed under heating, an etching liquid having a high speed in dissolving poly ITO (such as, the iron chloride based etching liquid containing iron chloride or the aqua regia based etching liquid containing aqua regia) is used because the transparent electrode 23 is composed mainly of polycrystal ITO (poly ITO). The poly ITO is not dissolved into the oxalic acid based etching liquid or the speed in dissolving the poly ITO is extremely low even if it is dissolved. Thus, the oxalic acid based etching liquid is not suitable for etching the poly ITO.

The higher the dissolving speed of the etching liquid, the shorter the etching time. However, if the dissolving speed is too high, it is difficult to control the etching. Since the dissolving speed when the amorphous ITO is dissolved into the iron chloride based etching liquid or the aqua regia based etching liquid is much higher than in the case in which the poly ITO is dissolved, it is difficult to control the etching. Therefore, the oxalic acid based etching liquid is more suitable for etching the amorphous ITO than the iron chloride based etching liquid and the aqua regalis based etching liquid.

Any of the oxalic acid based etching liquid, the iron chloride based etching liquid and the aqua regalis based etching liquid does not dissolve the inorganic protection film 21 composed mainly of $SnO_2$ or dissolving speed is far lower than the dissolving speed of ITO.

EXAMPLES

Example 1

A first target 55 composed mainly of $SnO_2$ and with $Sb_2O_3$ added as an impurity and a second target 56 composed mainly of $In_2O_3$ and with $SnO_2$ added as an additive were placed inside the film forming chamber 5 in the aforementioned FIG. 2; and an object to be processed 19 was carried into the film forming chamber 5 without being heated in the heating chamber 3, while the heating chamber 3 and the film forming chamber 5 were kept in a high vacuum atmosphere.

While an Ar gas and an oxygen gas were being fed into the film forming chamber 5, a direct current voltage was applied to the first and second targets 55, 56, an inorganic protection film 21 (film thickness of 50 Å) composed mainly of $SnO_2$ and a film of a transparent electrode 23 composed mainly of ITO (film thickness of 1500 Å) were formed on a surface of the resin layer 22 under a non-heating condition by the steps of the aforementioned FIGS. 1(*b*) and (*c*). This was taken as an evaluation substrate in Example 1.

Example 2

An evaluation substrate produced under the same condition in Example 1 was annealed by heating in air for one hour, and was taken as an evaluation substrate in Example 2.

Example 3

An evaluation substrate in Example 3 was produced under the same condition as in the above-discussed Example 1, except that an object 19 to be processed was heated at 250° C. with the heaters provided in the heating chamber 3 and the film forming chamber 5 and an inorganic protection film 21 and a film of a transparent electrode 23 were formed.

Comparative Example 1

An evaluation substrate in Comparative Example 1 was produced under the same condition as in the above-discussed Example 1, except that the first target 55 was replaced by a target composed mainly of $SiO_2$ and a voltage to be applied to the first target 55 was changed from a direct current voltage to a radio frequency (RF) voltage. In Comparative Example 1 and the below-mentioned Comparative Examples 2 and 3, inorganic protection films are composed mainly of $SiO_2$.

Meanwhile, it is recognized that the speed in forming the inorganic protection films in Examples 1 to 3 are about three times as fast as the speed in forming the inorganic protection films in Comparative Examples 1 to 3, and that the inorganic protection film composed mainly of $SnO_2$ has a higher efficiency film forming than the inorganic protection film composed mainly of $SiO_2$.

Comparative Example 2

The evaluation substrate in Comparative Example 1 was annealed by heating in air for 1 hour, and was taken as an evaluation substrate in Comparative Example 2.

Comparative Example 3

An evaluation substrate in Comparative Example 3 was produced under the same condition as in the above-discussed Comparative Example 1, except that an object to be processed was heated under the same condition as in Example 3 during film-forming the inorganic protection film and the transparent electrode.

<Adhesion Test after Film Formation>

With respect to Examples 1 to 3 and Comparative Examples 1 to 3, adhesive tape was attached to a surface of the transparent electrode 23, and thereafter the adhesive tape was peeled. Then, whether the transparent electrode 23 was exfoliated from the inorganic protection film 21 or not was checked. The adhesion test after the film formation was carried out for the evaluation substrates before an etching test mentioned later was performed.

<Observation with Stereo Microscope>

The Appearances of the respective evaluation substrates in Examples 1 to 3 and Comparative Examples 1 to 3 were observed with a stereo microscope before and after the etching; and whether the transparent electrode 23 and the inorganic protection film 21 ($SnO_2$ thin film and $SiO_2$ thin film) were peeled or not was checked.

The etching was carried out by immersing the evaluation substrates in Examples 1 to 3 and Comparative Examples 1 to 3 into three kinds of etching liquids (liquid temperature 40° C.) of: the oxalic acid based etching liquid; the iron chloride based etching liquid; and the aqua regia based etching liquid. In this case, it is presumed that the transparent electrode is polycrystallized (polycrystallization) in the evaluation substrates having heated during the film formation or thereafter (Examples 2 and 3 and Comparative Examples 2 and 3), and none of these evaluation substrates were subjected to the etching by using the oxalic acid based etching liquid designed for an amorphous ITO thin film. It is noted that "—" in the following Table 1 indicates that no etching was carried out.

TABLE 1

Heating Conditions and Test Results

|  | Heating Conditions | Inorganic Protection Film/Transparent Electrode (Main Component) | Adhetion Test after Film Formation | Observation Results by Scanning Electron Microscope (As to whether there is a delamination) | | | |
|---|---|---|---|---|---|---|---|
|  |  |  |  | After Film Formation (Before Etching) | After Etching ITO (Etching Liquid Temparature 40° C.) | | |
|  |  |  |  |  | Oxalic Acid based | Iron Chloride based | Aqua Regia based |
| Example 1 | Without Heating | $SnO_2$/ITO | None | None | None | None | None |
| Comparative Example 1 |  | $SiO_2$/ITO | None | None | None | None | None |
| Example 2 | Unheated during Film Formation + Annealed in the Air | $SnO_2$/ITO | None | None | — | None | None |
| Comparative Example 2 |  | $SiO_2$/ITO | None | None | — | None | None |
| Example 3 | Heated at 250° C. during Film Formation | $SnO_2$/ITO | None | None | — | None | None |
| Comparative Example 3 |  | $SiO_2$/ITO | Exfoliated | Exfoliated | — | Exfoliated | Exfoliated |

When the inorganic protection films composed mainly of $SiO_2$ were heated during the film formation, abnormal appearances were observed before and after etching; and delamination occurred between the inorganic protection film 21 and the resin layer 22.

The inorganic protection film composed mainly of $SiO_2$ has a greater difference in the linear expansion coefficient between the resin layer 22 and also in the linear expansion coefficient between the transparent electrode 23 than the inorganic protection film 21 composed mainly of $SnO_2$. The Comparative Example 1, which was film-formed without heating although composed mainly of the same $SiO_2$, did not exfoliate; consequently, it is presumed that the exfoliation occurred due to composite factors of stress during the polymerization of ITO by heating and the difference in the expansion amount by heating.

On the other hand, the inorganic protection film 21 composed mainly of $SnO_2$ was not exfoliated in any of the cases, so that results in the adhesion test were good. Since the $SnO_2$ thin film had smaller differences in the linear expansion coefficient between the transparent electrode 23 and between the resin layer 22 than $SiO_2$, it is presumed that the differences in the expansion amount by heating are in an acceptable range, and good adhesion was obtained.

In Comparative Example 2, the constituting material of the first target 55 was the same as that of Comparative Example 3, but no exfoliation was observed. This is presumed such that as compared to a case where the film formation is performed under heating in the vacuum atmosphere like Comparative Example 3, the stress is smaller when heating is performed in air as in Comparative Example 2; thus, exfoliation does not occur.

Since the pressure is lower in vacuum than in air, the expansion by heating is more conspicuous, so that the difference in the heat expansion coefficient provides a great influence in the film formation under heating in the vacuum atmosphere.

Crystals of not only ITO but also the other $In_2O_3$ based material and the ZnO based material grow more when the film formation is performed with their substrates being heated in the vacuum atmosphere.

Therefore, the method for producing the color filter according to the present application in which the inorganic thin film composed mainly of $SnO_2$ is formed is particularly effective in preventing exfoliation when the film of the transparent electrode is formed under heating in the vacuum atmosphere to crystallize the constituting material.

Meanwhile, it is not desirable to perform the film formation or the annealing treatment in air, because the steps not only increase, but there is also a possibility that the resin layer 22 is denatured or that the specific resistance of the transparent electrode 23 increases.

<Etching Resistance Test>

Each of $SnO_2$ thin films or $SiO_2$ thin films was formed on a surface of a glass substrate in a shape of a single film (thickness 1000 Å) under the same condition as in forming the inorganic films in Examples 1 to 3 and Comparative Examples 1 to 3, thereby producing evaluation substrates in Reference Examples 1 to 6. Combinations of heating conditions and materials are listed in the following Table 2.

TABLE 2

Evaluation Results in Etching Resistance

| | Heating Conditions | Material of the Inorganic Protection Film | Etching Liquids | | | | | |
|---|---|---|---|---|---|---|---|---|
| | | | Oxalic Acid based | | Iron Chloride based | | Aqua Regia based | |
| | | | Room Temperature | 40° C. | Room Temperature | 40° C. | Room Temperature | 40° C. |
| Reference Example 1 | Without Heating | $SnO_2$ | Not Dissolved | Not Dissolved | Not Dissolved | Not Dissolved | Not Dissolved | Not Dissolved |
| Reference Example 2 | | $SiO_2$ | Not Dissolved | Not Dissolved | Not Dissolved | Not Dissolved | Not Dissolved | Not Dissolved |
| Reference Example 3 | Unheated during Film Formation + Annealed in the Air | $SnO_2$ | Not Dissolved | Not Dissolved | Not Dissolved | Not Dissolved | Not Dissolved | Not Dissolved |
| Reference Example 4 | | $SiO_2$ | Not Dissolved | Not Dissolved | Not Dissolved | Not Dissolved | Not Dissolved | Not Dissolved |
| Reference Example 5 | Heated at 250° C. during Film Formation | $SnO_2$ | Not Dissolved | Not Dissolved | Not Dissolved | Not Dissolved | Not Dissolved | Not Dissolved |
| Reference Example 6 | | $SiO_2$ | Not Dissolved | Not Dissolved | Not Dissolved | Not Dissolved | Not Dissolved | Not Dissolved |

An ITO crystal grows most largely by film formation of ITO performed under heating in the vacuum atmosphere due to the particles being adhered to each other under such a condition. On the other hand, in the case where heating (annealing) is performed in air after the film formation without heating, progress in crystallization of the particles themselves can be made, but since the particles are not adhered to each other, growth of a crystal does not progress much as compared to the film formation with heating.

When an evaluation substrate having been annealed after the film formation without heating is observed with an SEM (scanning electron microscope), the particles grow to some degree, but the particles are smaller than those in the film formation with heating.

That is, when the film is formed under heating in the vacuum atmosphere, the particles easily move relative to each other, and grow in a state such that they are adhered to each other. On the other hand, when the annealing is performed after the film formation without heating, the particles are crystallized in a stand-alone state, so that the stress is small, and not so much of the problem of exfoliation is experienced.

Measurement of the specific resistances of the $SnO_2$ thin films and the $SiO_2$ thin films of the respective evaluation substrates in Reference Examples 1 to 6 revealed that the specific resistance of each thin film is higher than that of the ITO thin film; and more particularly, the specific resistances of the $SnO_2$ thin film are 100 times or more as large as that of the ITO thin film in any heating condition.

Since the inorganic protection film 21 of the liquid crystal display device is generally required to have 10 times or more, or desirably 100 times or more, as high as that of the transparent electrode 23, it is understood that the $SnO_2$ thin film is excellent as the inorganic protection film 21 in terms of electric characteristics.

Next, whether or not the evaluation substrates in Reference Examples 1 to 6 were dissolved was checked under the condition where they were immersed into the oxalic acid based etching liquid, the iron chloride based etching liquid and the aqua regia based etching liquid at each of the liquid temperature of room temperature and 40° C. As a result, any of the $SnO_2$ thin films was not dissolved as shown in the above Table 2.

As discussed above, the oxalic acid based etching liquid is an etching liquid for the amorphous ITO film; and the iron chloride based and the aqua regalis based etching liquids are etching liquids for the poly ITO film. It is thus understood that the $SnO_2$ thin film functions as an etching stopper regardless of the etching condition, either when the amorphous ITO film is etched or when the poly ITO film is etched.

What is claimed is:

1. A method for producing a color filter comprising the steps of:
   an inorganic protection film forming step for forming an inorganic protection film on a colored film-side surface of a substrate with the colored film formed thereon by applying direct current to a first target, which includes $SnO_2$ and an impurity for increasing the electroconductivity thereof, in order to generate plasma for spattering the first target;
   a transparent electrode forming step for forming a transparent electrode on the surface of the inorganic protection film by applying direct current to a second target which is composed mainly of a transparent electroconductive material in order to generate plasma for spattering the second target; and
   a transparent electrode patterning step for patterning a transparent electrode by bring the transparent electrode into contact with an etching liquid which dissolves the inorganic protection film at a speed slower than the speed in dissolving the transparent electrode.

2. The method for producing a color filter as set forth in claim 1, wherein the specific resistance of the inorganic protection film is 10 times or more as large as the specific resistance of the transparent electrode.

3. The method for producing a color filter as set forth in claim 2, further comprising the steps of:
   forming the film forming atmosphere with an oxidation gas including oxygen atom in its chemical structure added; and
   sputtering the first and second targets in a state such that a partial pressure of the oxidation gas included in the film forming atmosphere above the surface of the first target is made higher than a partial pressure of the oxidation gas included in the film forming atmosphere above the surface of the second target.

4. The method for producing a color filter as set forth in claim 1, wherein the inorganic protection film forming step and the transparent electrode forming step are carried out inside the same vacuum chamber.

5. The method for producing a color filter as set forth in claim 4, wherein oxidation gas and spattering gas are introduced to the vacuum chamber.

6. The method for producing a color filter as set forth in claim 4 or claim 5, wherein the substrate is carried inside the vacuum chamber such that the substrate opposes to the first target, next to the second target.

7. The method for producing a color filter as set forth in claim 1, wherein the impurity includes at least one of the elements of the Group 5B elements, Group 5A elements, Group 3A elements and Group 3B elements.

8. The method for producing a color filter as set forth in claim 1, wherein the impurity includes Sb.

9. The method for producing a color filter as set forth in claim 1, wherein the transparent electrode includes either or both of $In_2O_3$ and ZnO.

* * * * *